(12) United States Patent
Mei

(10) Patent No.: US 7,099,116 B1
(45) Date of Patent: Aug. 29, 2006

(54) DISK DRIVE SUSPENSION WITH SECOND SPRING FUNCTION

(75) Inventor: Shijin Mei, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 11/123,494

(22) Filed: May 5, 2005

Related U.S. Application Data

(63) Continuation of application No. 09/895,484, filed on Jun. 29, 2001, now abandoned.

(60) Provisional application No. 60/263,772, filed on Jan. 24, 2001.

(51) Int. Cl.
*G11B 21/16* (2006.01)

(52) U.S. Cl. .................................. 360/244.8

(58) Field of Classification Search ............. 360/244.8, 360/244.2, 244.3, 244.9, 245.2
See application file for complete search history.

(56) References Cited

U.S. PATENT DOCUMENTS

| 6,483,669 | B1 * | 11/2002 | Krinke ..................... 360/244.1 |
| 6,539,609 | B1 * | 4/2003 | Palmer et al. ........... 29/603.03 |
| 6,600,631 | B1 * | 7/2003 | Berding et al. .......... 360/244.3 |
| 6,697,226 | B1 * | 2/2004 | Narayan et al. ............. 360/245 |

* cited by examiner

*Primary Examiner*—Angel Castro
(74) *Attorney, Agent, or Firm*—Louis J. Bachand

(57) ABSTRACT

A disk drive suspension comprising a metal member having a base portion, a distal portion and a spring portion therebetween is provided with a second spring of usually greater thickness that is parallel with and spaced from the first spring, and supported in place by base and distal plates of a stiffener attached to the metal member base and distal portions. The second spring connector is much reduced in width relative to the adjoining plates.

15 Claims, 5 Drawing Sheets

DISK DRIVE SUSPENSION WITH SECOND SPRING FUNCTION

CROSS-REFERENCE TO RELATED APPLICATIONS

This application is a continuation of U.S. patent application Ser. No. 09/895,484 filed Jun. 29, 2001 now abandoned, which claims the benefit of U.S. Provisional Application Ser. No. 60/263,772, filed Jan. 24, 2001.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention relates to disk drive suspensions, and, more particularly, to a disk drive suspension comprising a distal portion, a base portion and a spring portion between the distal portion and the base portion, and a stiffener attached to the suspension to lend a desired stiffness to the suspension. The suspension spring portion typically exerts a predetermined gram load on the distal portion to maintain a slider carried by the distal portion into a desired operating proximity to a rotating disk. The invention specifically relates to the addition of a second spring complementary in function to the suspension spring. The second spring traverses the suspension spring portion and may connect separated sections of the stiffener. The second spring adds a highly controllable spring force to the suspension to better control of the suspension spring rate, e.g. when the suspension material thinness limits spring rate obtainable from just the suspension, to reduce gram losses with use, and for other purposes to be described.

2. Description of the Related Art

Suspensions typically comprise a metal member that can be a load beam having a base portion, a spring portion and a rigid distal portion over which a conductor is passed to connect a slider carried by a separate flexure on the load beam distal portion to the device electronics, or the metal member can be the metal layer in a laminate of the metal layer, an insulative layer, and trace conductors as seen in so-called wireless suspensions. Wireless suspension metal layers are very thin and are frequently provided with supplemental stiffening. Stiffeners are added to the base portion and/or to the distal portion of the metal layer.

BRIEF SUMMARY OF THE INVENTION

In addition to stiffness problems, wireless suspension metal layers that are at a desired thickness for pitch and roll stiffness properties can be too thin to provide the desired degree of gram loading at the slider, or to retain the desired gram loading after continual loadings and unloadings of the head gimbal assembly. The present invention provides an improved suspension design through addition of a second spring. It is an object therefore of the present invention to provide an improved suspension. It is a further object to provide in a suspension of the wireless type a second spring to augment the metal layer spring portion. A further object is to provide in a suspension having a metal layer and stiffener at the base and distal portions of the suspension and a spring element extending between the stiffener base and distal portions that is typically of the thickness of the stiffener, but is of a much reduced width from its adjacent stiffener portions, to a width providing the desired second spring function in increasing the spring rate of the suspension, for example, while the first spring controls the $1^{st}$ torsion property.

These and other objects of the invention to become apparent hereinafter are realized in a disk drive suspension comprising a spring metal member having a base portion, a distal portion adapted to carry a slider, and a first spring comprising a spring portion of the metal member between the base and distal portions, the spring portion being adapted to exert a predetermined gram load on the distal portion, a stiffener comprising a base plate attached to the metal member at the base portion and distal plate attached at the distal portion, the stiffener base plate and distal plate having given widths and being free of attachment to the spring portion, and a second spring comprising a spring connector fixed between the stiffener base plate and distal plate, the connector traversing the spring portion and being free of attachment thereto, the spring connector having a greatly reduced width relative to the base plate and distal plate given widths, whereby movement of the metal member distal portion relative to the base portion controlled by the first spring spring portion is further controlled by the second spring spring connector attached between the base and distal plates as a function of the distal plate moving with the distal portion.

In this and like embodiments, typically, at least a part of the spring metal member is laminated to an insulative plastic film, the metal layer having a thickness of about 0.001 inch, the stiffener base plate, distal plate and spring connector are integral parts of a common web having a thickness of about 0.003 to about 0.004 inch, the stiffener base plate and distal plate each have a given width adjacent the spring connector of about 0.150 to about 0.200 inch, the spring connector having a width of about 0.010 inch, and the base plate, the distal plate, and the spring connector all have the same thickness.

In a preferred embodiment, the invention provides a disk drive suspension comprising a laminate of trace conductors, insulative film and a metal layer, the metal layer defining a spring metal member having a base portion adapted to mount on an actuator arm, a distal portion adapted to carry a slider, and a first spring comprising a spring portion of the metal member between the base and distal portions, the spring portion being adapted to exert a predetermined gram load on the distal portion, a stiffener comprising a base plate attached to the metal member at the base portion and distal plate attached at the distal portion, the stiffener base plate and distal plates each having given widths and each being free of attachment to the spring portion; and a second spring comprising a spring connector integral with and fixed between the stiffener base plate and distal plate, the connector traversing the spring portion and being free of attachment thereto, the spring portion having a greatly reduced width relative to the base plate and distal plate given widths, whereby movement of the metal member distal portion relative to the base portion controlled by the first spring spring portion is further controlled by the second spring spring connector attached between the base and distal plates as a function of the distal plate moving with the distal portion.

In a particularly preferred embodiment, the invention provides a disk drive suspension comprising a laminate of trace conductors, insulative film and a metal layer having a thickness of about 0.001 inch, the metal layer defining a spring metal member having a base portion adapted to mount on an actuator arm, a distal portion adapted to carry a slider, and a first spring comprising a spring portion of the metal member between the base and distal portions, the spring portion being adapted to exert a predetermined gram load on the distal portion, a stiffener comprising an integral web of spring metal having a thickness of about 0.003 to about 0.004 inch, the stiffener comprising a base plate attached to the metal member at the base portion and distal plate attached at the distal portion, the stiffener base plate and distal plates each having given widths of about 0.150 to about 0.200 inch and each being free of attachment to the spring portion; and a second spring comprising a spring connector having a width of about 0.010 inch and integral with and fixed between the stiffener base plate and distal plate and of like thickness therewith, the connector traversing the spring portion and being free of attachment thereto, whereby movement of the metal member distal portion relative to the base portion controlled by the first spring spring portion is further controlled by the second spring spring connector attached between the base and distal plates as a function of the distal plate moving with the distal portion.

In its method aspects, the invention contemplates the method of controlling movement of a suspension distal portion, that includes cantilevering the distal portion from a suspension base portion by first spring comprising a spring portion, and attaching a second spring that traverses the first spring in spaced, generally parallel relation supported by stiffener distal and base plates to further control the distal portion movement relative to the base portion.

BRIEF DESCRIPTION OF THE SEVERAL VIEWS OF THE DRAWINGS

The invention will be further described in conjunction with the attached drawings in which.

DETAILED DESCRIPTION OF THE INVENTION

Conventional suspensions have only a single spring area to perform the loading and unloading functions necessary in a suspension whether the suspension is of the traditional load beam type or a unibeam construction in which the metal layer in the flexible laminate furnishes the rigid member for applying spring force to the slider carried on the distal rigid portion by a flexure. The obtainable spring rate of the spring area is constrained by the available or suitable material thickness given al the other properties needed. Inadequate spring rate results in lower suspension stiffness, and increased gram loss from repeated loading and unloading in the head gimbal assembly during use. Adjustment of the suspension by adding more thickness to the load beam through still another thickness-adding plate beyond the metal layer and the stiffener plate has been tried but costs are increased.

In this invention, costs are little increased since the second, added spring function is readily provided by processing steps, i.e. etching, being effected anyway. Thus, in the invention, the already-in-place stiffening plates are shaped to define a second, added spring connector parallel with the first spring area and spaced therefrom. The use of a thickening plate in addition to the stiffening plates is avoided with the invention.

Figure 1:
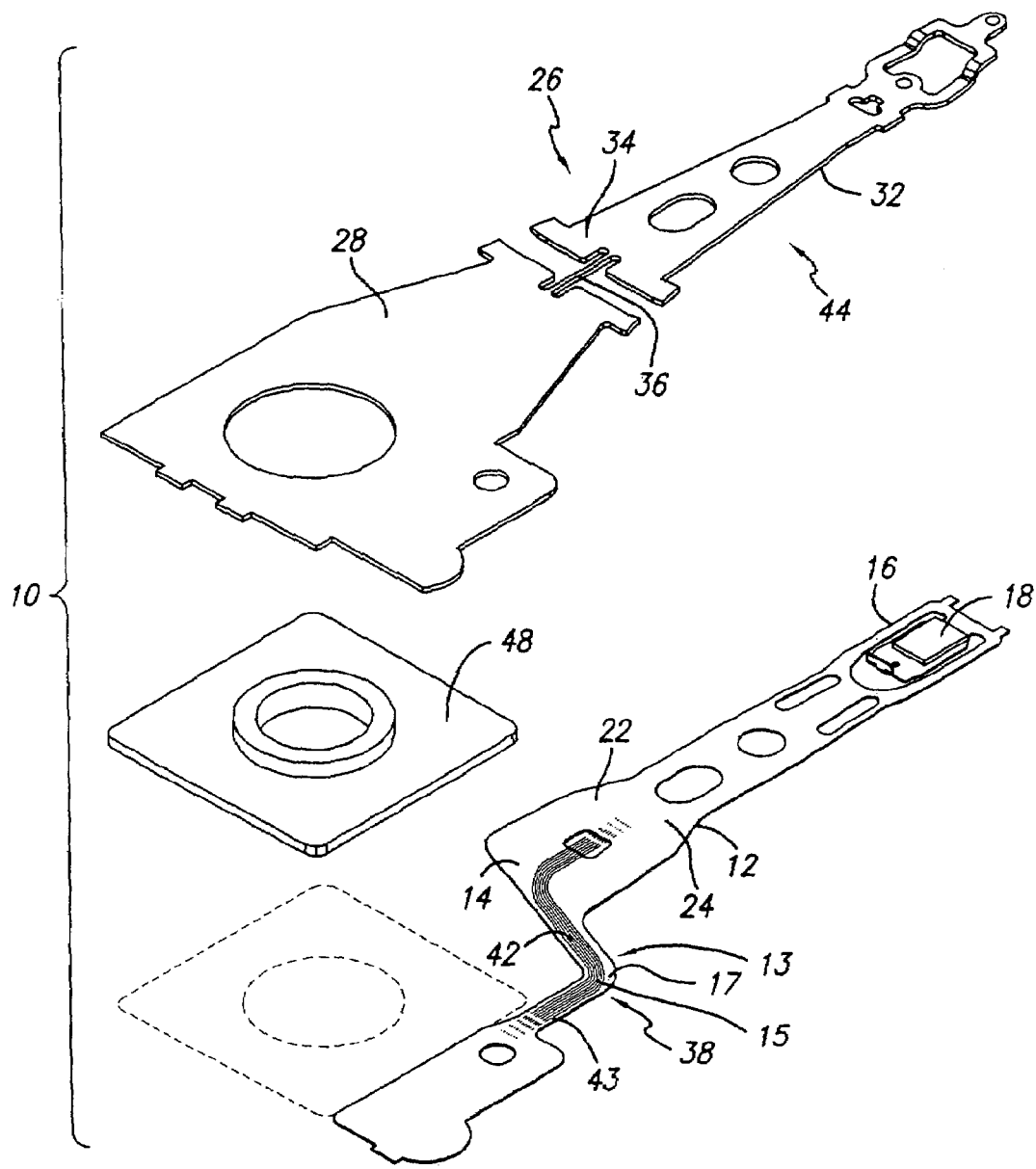
FIG. 1 is an exploded view of the invention suspension.
Figure 2A:
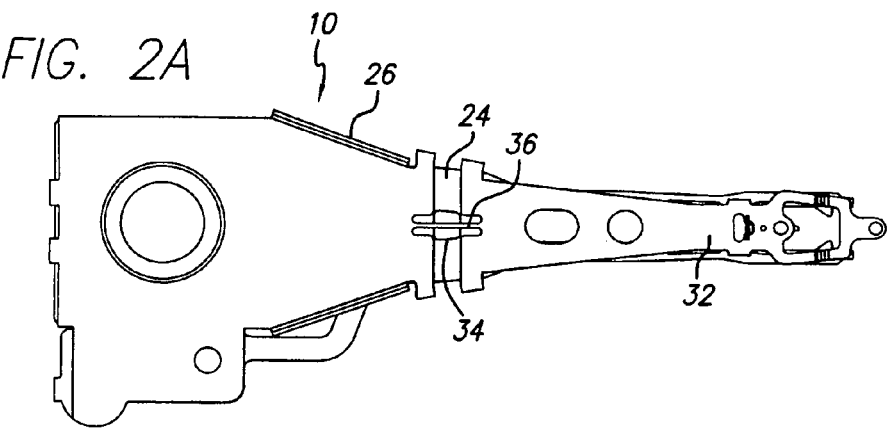
FIG. 2A is a bottom plan view thereof.
Figure 2B:
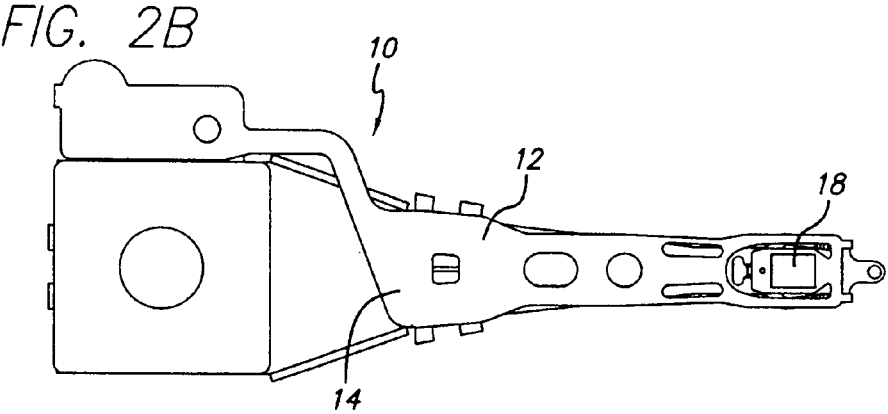
FIG. 2B is a top plan view thereof.
Figure 2C:
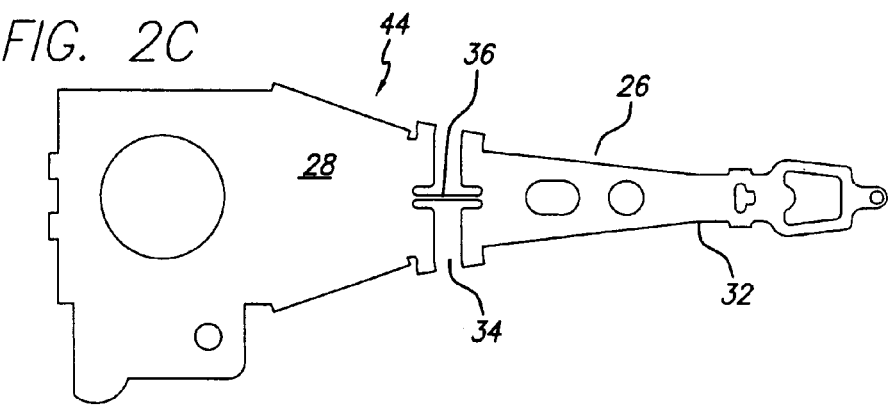
FIG. 2C is a bottom plan view of the stiffener portion thereof.
Figure 3A:
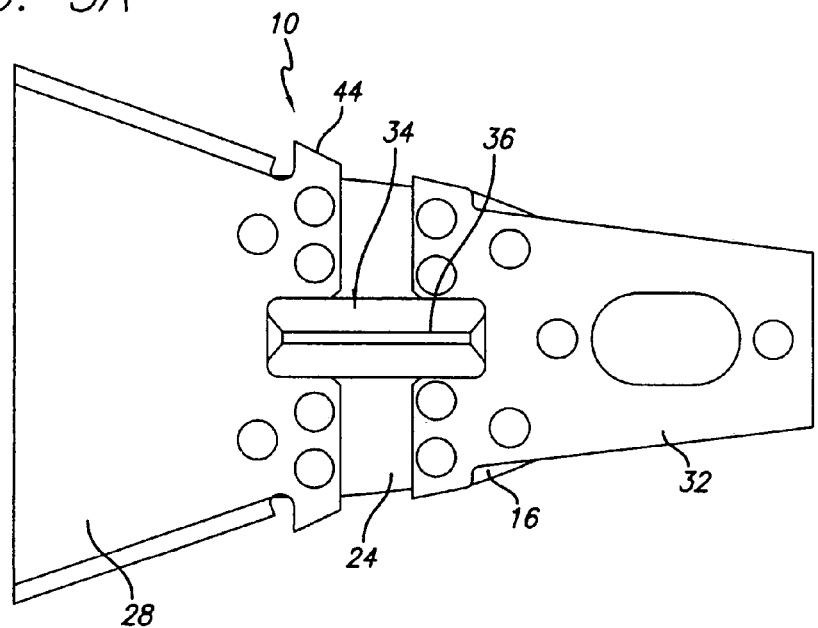
FIG. 3A is a fragmentary bottom plan view of the invention spring area.
Figure 3B:
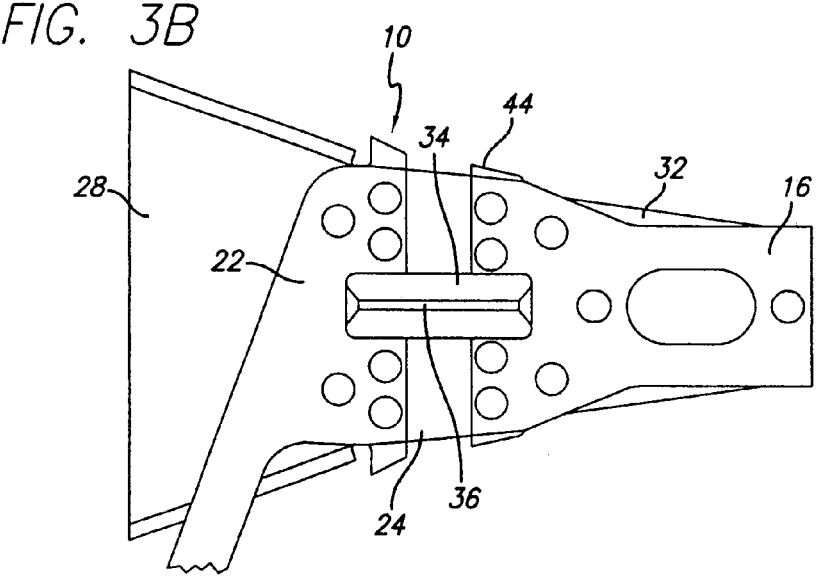
FIG. 3B is a fragmentary top plan view of the invention spring area.

With reference now to the drawings in detail, In FIGS. 1–3, the invention disk drive suspension is shown at 10 and comprises spring metal member 12 having a base portion 14, and a distal portion 16 adapted to carry a slider 18. Suspension 10 further comprises a first spring 22 comprising a spring portion 24 of the metal member 12 extending between the base and distal portions 14, 16. Spring portion 24 is adapted to exert a predetermined gram load on the distal portion 16 as is known. Metal member 12 is typically laminated in a laminate 13 with conductive traces 15 attached with an insulative film 17, shown only partially for clarity of illustration of the invention.

The suspension 10 further comprises a stiffener 26 that includes a base stiffener plate 28 attached to the metal member 12 at the base portion 14, and distal stiffener plate 32 attached at the distal portion 16. Stiffener base plate 28 and distal plate 32 have given widths typically like that of member 12 as shown, and are free of attachment to the spring portion 24.

The invention provides a second spring 34 comprising a spring connector 36 fixed between the stiffener base plate 28 and distal plate 32. Connector 36 traverses the spring portion 24 and is free of attachment to that spring portion. It will be noted that the spring connector 36 has a greatly reduced width relative to the base plate 28 and distal plate 32 given widths. The arrangement of parts provides control of the movement of the metal member distal portion 16 relative to the base portion 14 by the first spring spring portion 24. The second spring spring connector 36 attached between the base and distal plates 28, 32 further controls this movement as a function of the distal plate moving with the distal portion against the resistance provided by the base plate transmitted through the spring connector 36.

As mentioned, typically, the spring metal member 12 is the metal layer in the laminate 13 with trace conductors 15 and insulative plastic film 17. Trace conductors 15 are atop the film 17 to be electrically isolated from the metal member 12. In a commonly available form the laminate 13 has a thickness of about 0.001 inch.

The stiffener base plate 28, distal plate 32 and spring connector 36 are preferably integral parts of a common web 44 having a thickness of about 0.003 to about 0.004 inch, and a typical given width adjacent the spring connector of about 0.150 to about 0.200 inch. The spring connector 36 typically has a width of about 3 to 10% of the adjacent plates 28, 32, or in a given case about 0.010 inch where the plate widths are as just noted. Suitably, but not necessarily, the base plate 28, the distal plate 32, and the spring connector 36 are formed from the common web 44, and unless selectively etched to vary thickness, all have the same thickness.

In a further embodiment, the metal member 12 from the laminate 38 has its base portion 14 mounted to actuator arm (not shown) with mount plate 48. Suspension member distal portion 16 carries the slider 18.

In its method aspects, the invention contemplates the method of controlling movement of a suspension distal portion 16, that includes cantilevering the distal portion from a suspension base portion 14 by first spring 22 comprising spring portion 24, and attaching a second spring 34 comprising a connector spring 36 fixed between the base and distal stiffener plates 28, 32 so that the second spring traverses the first spring in spaced, generally parallel relation to the suspension distal and base portions to further control the distal portion movement relative to the base portion.

Table 1 records data on the stiffness in N/M and free state angle for three thicknesses of stiffener, various combinations of first and second springs, and with different length second springs. Shorter length second springs provide more stiffness and reduced free state angles, as shown. Some of this data is presented in FIG. 4, where Case 2 is the shorter second spring and Case 3 the longer second spring.

TABLE 1

| Case | 1$^{st}$ Spring Width | 1$^{st}$ Spring Thickness | 2$^{nd}$ Spring Width | 2$^{nd}$ Spring Length | 2$^{nd}$ Spring Thickness | Free State angle (degree) | Kv (N/M) |
|---|---|---|---|---|---|---|---|
| 1  | NA      | NA       | NA      | NA      | NA       | NA    | NA    |
| 2  | 0.070"  | 0.0079"  | 0.004"  | 0.075"  | 0.003"   | 14.37 | 9.8   |
| 2a | 0.070"  | 0.0079"  | 0.004"  | 0.025"  | 0.003"   | 9.71  | 14.7  |
| 2b | 0.070"  | 0.0079"  | NA      | NA      | NA       | 30.9  | 3.82  |
| 3  | 0.070"  | 0.0079"  | 0.004"  | 0.075"  | 0.0035"  | 11.77 | 12.4  |
| 3a | 0.070"  | 0.0079"  | 0.004"  | 0.025"  | 0.0035"  | 7.01  | 21.87 |
| 3b | 0.070"  | 0.0079"  | NA      | NA      | NA       | 29.87 | 3.94  |
| 4  | 0.070"  | 0.0079"  | 0.004"  | 0.075"  | 0.004"   | 8.67  | 16.9  |
| 4a | 0.070"  | 0.0079"  | 0.004"  | 0.025"  | 0.004"   | 5.34  | 31.08 |
| 4b | 0.070"  | 0.0079"  | NA      | NA      | NA       | 29.03 | 4.02  |

Table 2 following shows the first and second bending mode, first and second torsion mode and sway for the Cases in Table 1.

TABLE 2

| Case | Bending1 | Bending2 | Torsion1 | Torsion2 | Sway |
|---|---|---|---|---|---|
| 1  |      |      | NA    |        |       |
| 2  | 2017 | 4238 | 4892  | 14756  | 12372 |
| 2a | 2026 | 4240 | 5139  | >13000 | 12486 |
| 2b | 1994 | 4075 | 5062  | >13000 | 11950 |
| 3  | 2306 | 4787 | 5207  | 15322  | 12087 |
| 3a | 2326 | 4807 | 5417  | 15322  | 12113 |
| 3b | 2271 | 4574 | 5308  | 15322  | 11943 |
| 4  | 2586 | 5295 | 5414  | 15626  | 11952 |
| 4a | 2621 | 5331 | 5564  | 15699  | 11969 |
| 4b | 2533 | 5052 | 5438  | 15669  | 11960 |

Figure 4:
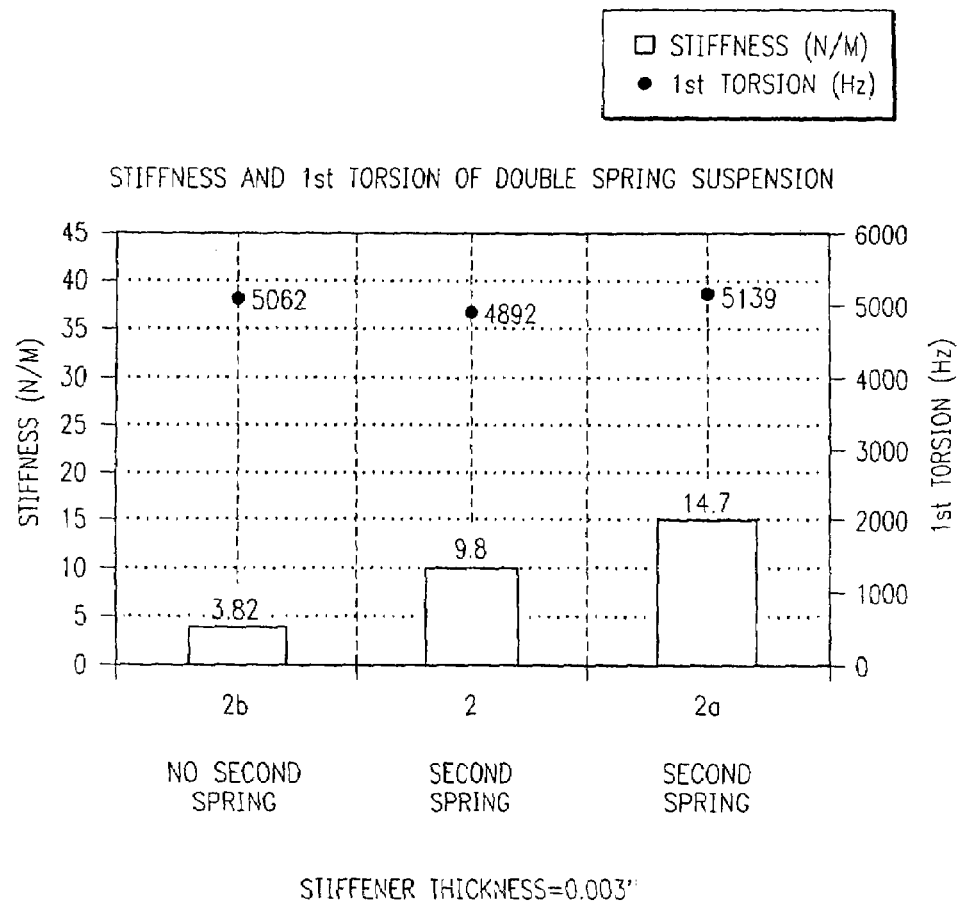
FIG. 4 is a graph of stiffness and $1^{st}$ torsion values at one stiffener thickness; and, FIG. 5 is a graph of stiffness and $1^{st}$ torsion values at a second stiffener thickness.

FIG. 4 is a graphical depiction of the increase in stiffness obtained through the use of the second spring while maintaining 1$^{st}$ torsion values high, based on values in Table 2. Stiffener thickness is 0.003 inch, as preferred in the invention. Stiffness in newtons per meter is plotted on the left axis, while 1$^{st}$ torsion in Hz is plotted on the right axis. Case 2 is a conventional suspension with the usual single spring provided by the laminate metal layer. Case 2a is an invention suspension in which the usual spring is augmented by a second spring. Case 2b is an invention suspension again with the usual spring augmented by a second spring.

Figure 5:
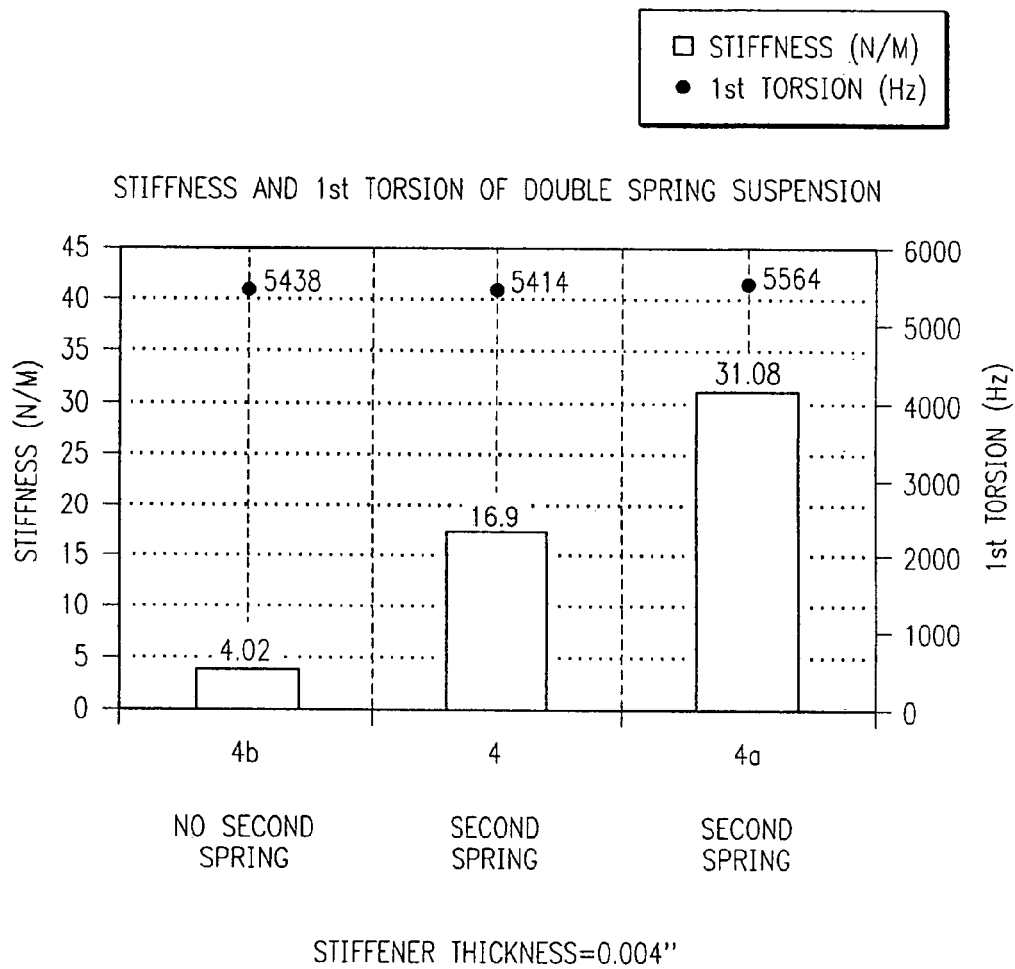

FIG. 5 provides a similar chart, also based on Table 2, for a stiffener thickness of 0.004 inch. The 1$^{st}$ torsion values of cases 4a and 4b are higher than the conventional case, 4, while the pattern of increased stiffness while maintaining high 1$^{st}$ torsion values, the hallmark of the invention, persists.

Thus, in FIGS. 4 and 5 both the stiffness and 1$^{st}$ torsion change. The first spring very well controls the 1$^{st}$ torsion; its graph is nearly flat meaning it does not change much with stiffness. The second spring controls the spring rate. If there is no second spring as proposed in the invention, the spring rate will be too low, but the use of the second spring will bring the spring rate to a desired value.

The invention thus provides an improved suspension, typically of the wireless type having a second spring to augment a laminate metal layer spring portion, in which the stiffener at the base and distal portions of the suspension are fixed to a second spring connector element that is typically of the thickness of the stiffener, but is of a much reduced width from its adjacent stiffener portions, to a width providing the desired second spring function in increasing the spring rate of the suspension, for example, while the first spring controls the 1$^{st}$ torsion property.

The foregoing objects are thus met.

I claim:

1. A disk drive suspension comprising a spring metal member having a base portion and a distal portion adapted to carry a slider, a first spring between said base and distal portions, said first spring being adapted to exert a predetermined gram load on said distal portion, a stiffener comprising a distal plate attached at said distal portion and having a width, said stiffener distal plate being free of attachment to said first spring, and a second spring comprising a spring connector traversing said first spring in distal plate fixed relation and free of attachment to said first spring, said spring connector width being about 3% to about 10% of said distal plate width, whereby movement of said metal member distal portion relative to said base portion controlled by said first spring is further controlled by said second spring spring connector as a function of said distal plate moving with said distal portion.

2. The disk drive suspension according to claim 1, in which at least a part of said spring metal member is laminated to an insulative plastic film.

3. The disk drive suspension according to claim 1, in which said distal plate and spring connector are integral parts of a common web.

4. The disk drive suspension according to claim 3, in which said common web has a thickness of about 0.003 to about 0.004 inch.

5. The disk drive suspension according to claim 3, in which said distal plate width adjacent said spring connector is about 0.150 to about 0.200 inch, said spring connector having a width of about 0.010 inch.

6. The disk drive suspension according to claim 5, in which said distal plate and said spring connector have the same thickness.

7. A disk drive suspension comprising a laminate of trace conductors, insulative film and a metal layer, said metal layer defining a spring metal member having a base portion adapted to mount on an actuator arm, and a distal portion adapted to carry a slider, and a first spring connecting said base and distal portions and adapted to exert a predetermined gram load on said distal portion, a stiffener comprising a distal plate free of attachment to said spring portion and attached at said distal portion, said distal plate having a width, and a second spring comprising a spring connector integral with said distal plate and traversing said spring portion free of attachment thereto, said spring connector having a width of about 3% to about 10% of said distal plate width, whereby movement of said metal member distal portion relative to said base portion controlled by said first spring is further controlled by said second spring spring connector as a function of said distal plate moving with said distal portion.

8. The disk drive suspension according to claim 7, in which said stiffener further comprises a base plate, said base plate, said distal plate and said spring connector are integral parts of a common web.

9. The disk drive suspension according to claim 8, in which said common web has a thickness of about 0.003 to about 0.004 inch.

10. The disk drive suspension according to claim 9, in which said distal plate width adjacent said spring connector is about 0.150 to about 0.200 inch, said spring connector having a width of about 0.010 inch.

11. The disk drive suspension according to claim 8, in which said base plate, said distal plate, and said spring connector have the same thickness.

12. The disk drive suspension according to claim 11, in which said spring metal member has a thickness of about 0.001 inch.

13. A disk drive suspension comprising a mount plate, a spring metal member having a base portion fixed to said mount plate, a distal portion adapted to carry a slider, and a first spring comprising a portion of said metal member between said base portion and said distal portion, said first spring being adapted to exert a gram load on said distal portion, and a stiffener comprising a distal plate attached to said distal portion, said distal plate having a width, and a second spring comprising a spring connector fixed between said mount plate and said distal plate, said connector traversing said first spring and free of attachment to said first spring, said spring connector having a width between about 3% to about 10% of said spring connector width, whereby movement of said distal portion relative to said based portion controlled by said first spring is further controlled by said spring connector connected between said mount plate and said distal plate in stiffening relation.

14. A disk drive suspension comprising a laminate of trace conductors, insulative film and a metal layer, said metal layer defining a spring metal member having a base portion adapted to mount on an actuator arm, a distal portion adapted to carry a slider, and a first spring comprising a spring portion of said metal member between said base and distal portions, said spring portion being adapted to exert a predetermined gram load on said distal portion, a stiffener comprising an integral web of spring metal, said stiffener comprising a base plate attached to said metal member at said base portion and distal plate attached at said distal portion, said stiffener base plate and distal plates each having given widths of about 0.150 to about 0.200 inch and each being free of attachment to said spring portion; and a second spring comprising a spring connector having a width of about 0.010 inch and integral with and fixed between said stiffener base plate and distal plate and of like thickness therewith, said connector traversing said spring portion and being free of attachment thereto, whereby movement of said metal member distal portion relative to said base portion controlled by said first spring spring portion is further controlled by said second spring spring connector attached between said base and distal plates as a function of said distal plate moving with said distal portion.

15. A method of controlling movement of a suspension distal portion, including cantilevering said distal portion from a suspension base portion by a first spring comprising a spring portion, and attaching a second spring that traverses said first spring in spaced, generally parallel relation supported by a stiffener distal plate, said second spring having a width of about 3% to about 10% of said distal plate to further control said distal portion movement relative to said base portion.

* * * * *